(12) United States Patent
Bates

(10) Patent No.: US 8,611,119 B2
(45) Date of Patent: Dec. 17, 2013

(54) CONTACTLESS INTERFACE

(75) Inventor: Colin Bates, Lanark (GB)

(73) Assignee: Inside Contactless S.A., Aix-en-Provence Cedex (FR)

( * ) Notice: Subject to any disclaimer, the term of this patent is extended or adjusted under 35 U.S.C. 154(b) by 0 days.

(21) Appl. No.: 13/329,641

(22) Filed: Dec. 19, 2011

(65) Prior Publication Data

US 2012/0087164 A1 Apr. 12, 2012

Related U.S. Application Data

(62) Division of application No. 12/259,161, filed on Oct. 27, 2008, now abandoned.

(51) Int. Cl.
*H02M 7/217* (2006.01)

(52) U.S. Cl.
USPC .......................................... 363/127; 323/311

(58) Field of Classification Search
USPC .............. 363/73, 74, 127; 323/311, 312, 313, 323/314, 315
See application file for complete search history.

(56) References Cited

U.S. PATENT DOCUMENTS

| | | | |
|---|---|---|---|
| 5,666,044 A | 9/1997 | Tuozzolo | |
| 6,134,130 A | 10/2000 | Connell et al. | |
| 6,147,605 A | 11/2000 | Vega et al. | |
| 6,275,681 B1 | 8/2001 | Vega et al. | |
| 6,366,061 B1 | 4/2002 | Carley et al. | |
| 6,515,919 B1 | 2/2003 | Lee | |
| 7,071,630 B1 * | 7/2006 | York | 315/224 |
| 7,141,939 B2 * | 11/2006 | Nagasawa et al. | 315/291 |
| 7,738,272 B2 | 6/2010 | Klapf et al. | |
| 2003/0156436 A1 * | 8/2003 | Moreaux et al. | 363/49 |
| 2004/0008013 A1 | 1/2004 | Gay | |
| 2005/0168159 A1 | 8/2005 | Nagasawa et al. | |
| 2006/0244545 A1 | 11/2006 | Briskin et al. | |
| 2008/0080214 A1 * | 4/2008 | Umeda et al. | 363/37 |

FOREIGN PATENT DOCUMENTS

| | | | |
|---|---|---|---|
| EP | 1560147 A3 | 5/2006 | |
| JP | 60051457 A | 3/1985 | |

OTHER PUBLICATIONS

Atmel Corporation, International Search Report and the Written Opinion of PCT Application No. PCT/US2009/058077 dated Nov. 3, 2009, 13 pages.

* cited by examiner

*Primary Examiner* — Nguyen Tran
(74) *Attorney, Agent, or Firm* — Panitch Schwarze Belisario & Nadel LLP

(57) ABSTRACT

Power extracted from an antenna inductively coupled to an alternating magnetic field is regulated to provide voltage supplies. In some implementations, a first voltage supply (e.g., 3.8 volts) provides regulated voltage to analog circuits and a second, lower, voltage supply (e.g., 1.4 volts) provides regulated voltage to digital circuits. The first voltage supply is regulated, using shunt regulation, by a first voltage regulator circuit. The second voltage supply is regulated, using a series regulation, by a second voltage regulator circuit. The second voltage regulator circuit is supplied by the shunted current from the first voltage regulator. Excess shunt current provided by the first regulator circuit can be bypassed (e.g., bypassed to ground). The second voltage regulator circuit can use a timer circuit to control the amount of charge transferred to a second voltage supply rail. The timer circuit can compensate for different currents from the first voltage regulator circuit.

15 Claims, 4 Drawing Sheets

CONTACTLESS INTERFACE

RELATED APPLICATIONS

This U.S. patent application is a divisional of and claims priority under 35 U.S.C. §120 from U.S. patent application Ser. No. 12/259,161, filed on Oct. 27, 2008. The disclosure of this prior application is considered part of the disclosure of this application and is hereby incorporated herein by reference in its entirety.

TECHNICAL FIELD

This subject matter relates generally to electronic interfaces, and more particularly to contactless interfaces for smart cards and other electronic devices.

BACKGROUND

A contactless smart card is commonly used for security access or payment systems. Contactless smart cards generally include an antenna, in the form of an inductor, coupled to an integrated circuit (IC). The IC commonly includes a capacitor which forms a resonant circuit with the antenna. A card reader presents an alternating magnetic field that excites the inductor/capacitor resonant circuit, which in turn energizes and powers the IC. The IC can then perform one or more functions, such as transmitting a card number through the antenna to the card reader.

Some smart cards require supply voltages to power both digital (e.g., 1.4 volts) and analog circuits (e.g., 3.8 volts). The supply voltages are generated from the voltage across the capacitor in the resonant circuit. To ensure stable Direct Current (DC) supply voltages, the alternating voltage is rectified and regulated using, for example, a bridge rectifier and regulator circuits.

Some conventional smart cards use two regulators. A first, shunt, regulator provides loose regulation (e.g., +/−1 volt swing) of an analog supply voltage. The loose regulation allows for reception/transmission by field modulation. A second regulator, for powering digital circuitry, is powered from the analog supply voltage provided by the first regulator.

These conventional smart cards suffer from processor noise (being seen by the card reader) which can cause various problems with reception by the reader of data from the smart card. Moreover, the first regulator often requires the use of a large decoupling capacitor to support the second regulator. A large decoupling capacitor requires a large area and can attenuate modulation at low field strengths during transmission and reception.

SUMMARY

Power extracted from an antenna inductively coupled to an alternating magnetic field is regulated to provide voltage supplies. In some implementations, a first voltage supply (e.g., 3.8 volts) provides regulated voltage to analog circuits and a second, lower, voltage supply (e.g., 1.4 volts) provides regulated voltage to digital circuits. The first voltage supply can be regulated, using shunt regulation, by a first voltage regulator circuit. The first voltage supply can be output on a first voltage supply rail. The second voltage supply can be regulated, using series regulation, by a second voltage regulator circuit. The second voltage regulator circuit is supplied by the shunted current from the first voltage regulator circuit. Excess shunt current provided by the first voltage regulator circuit can be bypassed (e.g., bypassed to ground). The second voltage regulator circuit can use a timer circuit to control the amount of charge transferred to a second voltage supply rail. The timer circuit can compensate for the different currents from the first voltage regulator circuit. Bypassing excess shunt current obviates the need for the first voltage regulator control circuit to adapt to load changes on the second voltage supply rail.

Advantages of the disclosed contactless interface with switching regulator include, but are not limited to, a reduction in size of decoupling capacitors, faster acting regulators and simple control loops for the regulators that are easy to stabilize.

DETAILED DESCRIPTION

Example Contactless Interface

Figure 1:
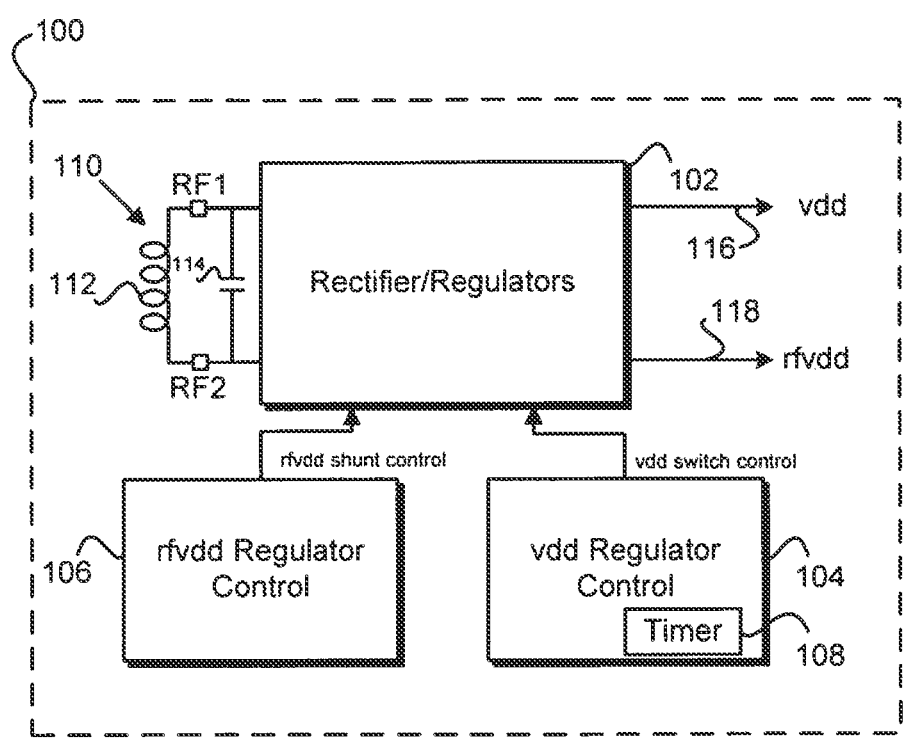
FIG. 1 is a block diagram of an example contactless interface, including a switching rectifier/regulator circuit.

FIG. 1 is a block diagram of an example contactless interface 100. In some implementations, contactless interface 100 includes switching rectifier/regulator circuit 102 (hereinafter also referred to as "switching regulator circuit 102"), rfvdd regulator control 104 and vdd regulator control 106 and LC circuit 110. Although the example interface 100 includes two regulators. Other implementations can include three or more regulators for providing three or more regulated voltage supplies.

Contactless interface 100 can be used for contactless smart cards or other devices that use two or more regulated power supplies. In an example smart card implementation, switching regulator 102 regulates voltage across contactless pins. Interface 100 provides a first regulated voltage supply ("vdd") on supply rail 116 for supplying digital circuits and a second regulated power supply ("rfvdd") on supply rail 118 for supplying for analog circuits. Regulator control circuits 104 and 106 can implement control loops for controlling the vdd regulator and rfvdd regulator, respectively. Regulator control circuits 104, 106, provide switch and shunt control signals, respectively, which can be used to control the vdd and rfvdd voltage regulators in switching regulator 102. In some implementations, switching regulator 102 can be implemented in an IC chip. Regulator control circuits 104, 106, can be included on the IC with the switching regulator 102 or provided by external other circuits or IC devices.

In some implementations, LC circuit 110 comprises antenna 112 (e.g., a coil) coupled in parallel to capacitor 114. LC circuit 110 is operable for inductively coupling to an alternating electromagnetic field which can be generated by a smart card reader or other device. The capacitance of capacitor 114 can be adjusted to make antenna 112 resonant at a desired carrier frequency (e.g., 13.56 MHz).

In some implementations, a tuned tank circuit coupled to a dipole antenna can be used to receive the alternating electromagnetic field generated by the smart card reader or other device. In some implementations, switching regulator 102 can be included in a single integrated circuit chip. One or more of the components of switching regulator 102 (e.g., capacitor 114) can be external to the integrated circuit chip.

Example Switching Regulator Circuit

Figure 2:
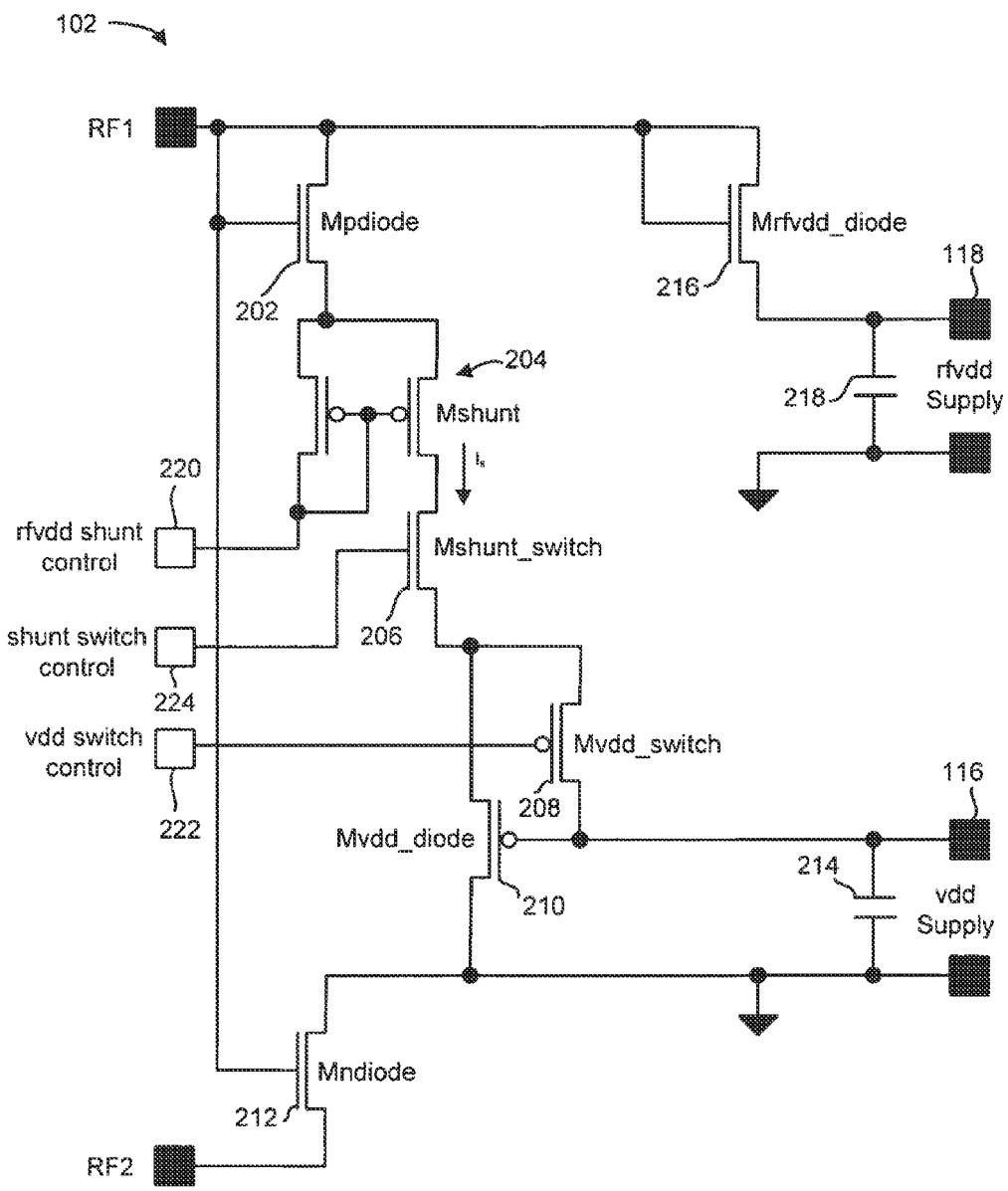
FIG. 2 is a simplified schematic diagram of an example switching rectifier/regulator circuit of FIG. 1.

FIG. 2 is a simplified schematic diagram of example switching regulator circuit 102 of FIG. 1. The switching regulator circuit 102 is active when RF1 is at a higher potential then RF2. This is true for half of the carrier cycle. A second identical circuit can be used on the other half of the carrier cycle when RF2 is at a higher potential than RF1.

Rectification of the alternating current ("carrier signal") output from resonant circuit 110 (e.g., antenna 112 and capacitor 114) is performed by devices 216 (Mrfvdd_diode), 202 (Mpdiode) and 212 (Mndiode). In some implementations, devices 216, 202, 212 are transistors (e.g., MOSFET) biased to operate as diodes, allowing current to flow in one direction through the devices. Devices 216, 202, 212 form a half bridge rectifier circuit. Device 212 couples RF2 to ground. Device 202 provides current to supply current mirror 204 (Mshunt) and vdd voltage supply rail 116. Device 216 provides current to supply circuits (e.g., analog circuits) supplied by rfvdd voltage supply rail 118. An rfvdd shunt control bias current generated by rfvdd regulator control circuit 106 is applied to input 220 for controlling the flow of shunt current, $I_s$, through current mirror 204.

When the device 206 is biased "on", device 202 outputs shunt current, $I_s$, which passes through current mirror 204 and device 206 (Mshunt_switch). The current path then splits and flows to ground either through device 210 (Mvdd_diode) or device 208 (Mvdd_switch) and a digital load (not shown).

Shunt current, $I_s$, controls the voltage at RF1 which effectively controls the voltage on rfvdd voltage supply rail 118. Shunt current, $I_s$, and rfvdd shunt control bias current regulate the rfvdd voltage supply for one half cycle of the carrier signal.

Device 208 (Mvdd_switch) is a switching device (e.g., a transistor biased to operate as a switch) and is either biased "on" or "off" based on a vdd switch control signal applied at input 222. When device 208 is biased "on," current from current mirror 204 flows through device 208 into vdd decoupling capacitor 214 and into a digital load (not shown). No current will flow through device 210, as device 208 will reduce the gate-source voltage of device 210 to below its threshold voltage $V_t$. When device 208 is biased "off" the gate-source voltage of device 210 will rise and device 210 will act as a source follower, conducting shunt current, $I_s$, to ground.

During the operation of switching regulator 102 described above, the source voltage of device 206 will either be at $V_t$ above the supply voltage vdd (e.g., 0.7 volts) or at a saturated voltage $Vds_{sat}$ above the supply voltage vdd (e.g., 0.2 volts). Further, if vdd is tightly regulated, device 206 source will only vary by a small amount (e.g., 0.7–0.2=0.5) during operation of switching regulator 102.

Device 206 is a switching device (e.g., a transistor biased to operate as a switch) which can be biased "on" or "off" using a gate voltage supplied by shunt control signal applied to input 224. If device 206 is "on," a variation on a drain of device 206 will be only about 0.5 volts when device 208 switched from "on" to "off" or vice-versa. The load variation seen at RF1/RF2 (e.g., the load seen by a smart card reader) due to device 208 switching is minimal. Device 208 can be biased "on" once per cycle. The "on" time of device 208 provides the regulation of the vdd power supply on supply rail 116.

Shunt current, $I_s$, output from device 204 controls the voltage at RF1/2, which in turn sets the voltage of the rfvdd voltage supply rail 118. There is a weak regulation of the rfvdd voltage supply rail 118 to ensure that field modulation by another device (e.g., by a smart card reader) will be seen as a voltage variation at RF1/2. This can be important, for example, if the voltage at RF1/2 is used for demodulation of the carrier. When RF2 is at a higher potential than RF1, device 206 is switched off to prevent current from flowing back through p-type bulk connections.

Example Timer for Switch Control

Figure 3:
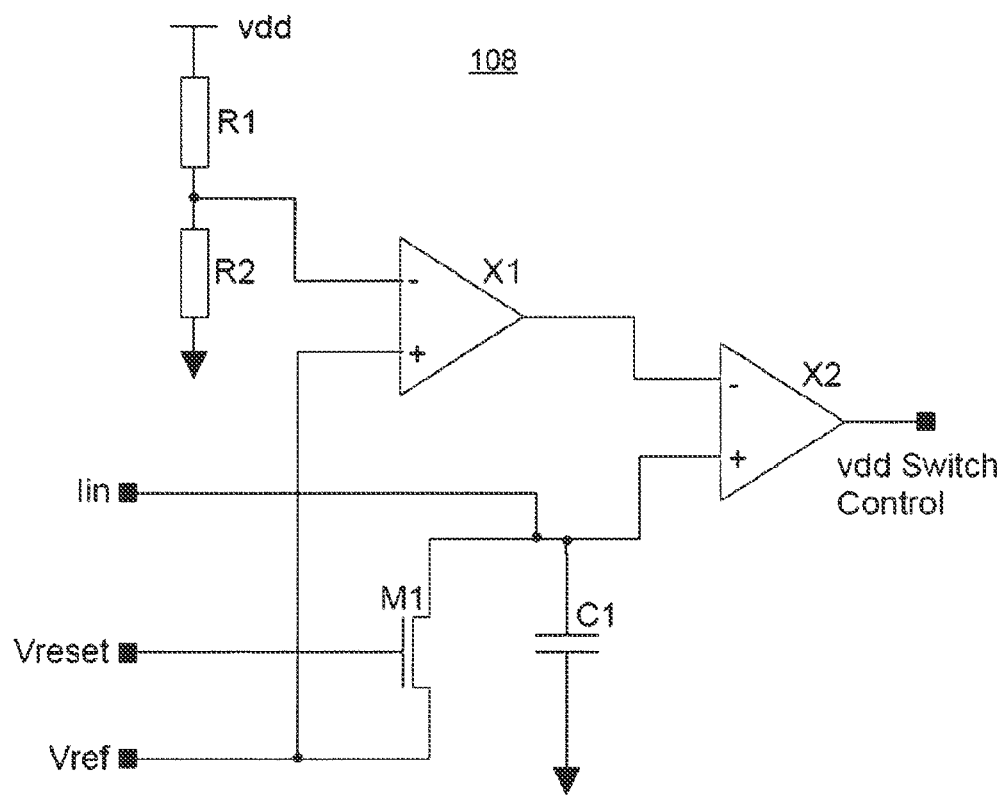
FIG. 3 is an example timer circuit for generating a switch control signal for controlling the Mvdd_switch shown in FIG. 2.
Figure 4:
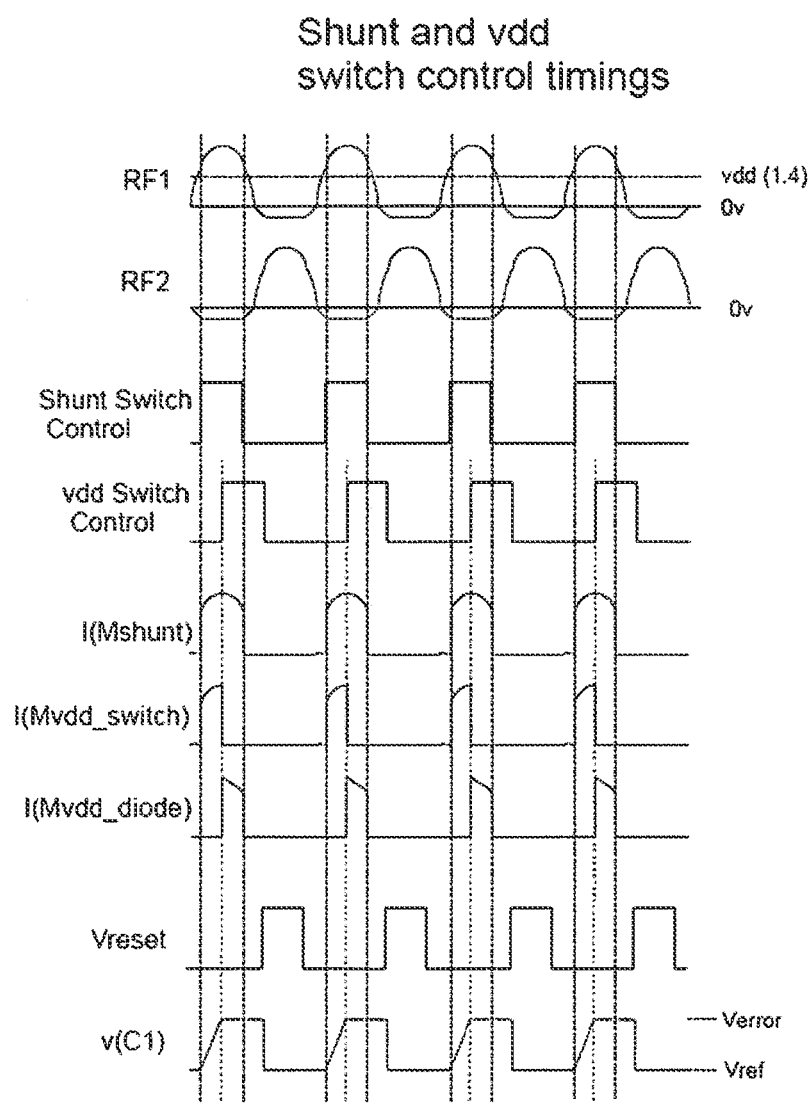
FIG. 4 is a timing diagram illustrating example shunt and vdd switch control timings.

FIG. 3 is an example timer circuit 108 for generating a vdd switch control signal for controlling the Mvdd_switch 208 shown in FIG. 2. FIG. 4 is a timing diagram illustrating example shunt and vdd switch control timings. The following description references both FIGS. 3 and 4.

Resistors R1, R2 form a voltage divider, dividing the vdd supply voltage, so that it can be compared to a reference voltage Vref. Amplifier X1 is an error amplifier configured for comparing the divided vdd supply voltage to the reference voltage, Vref, and outputting an amplified error voltage. The amplified error voltage is input to comparator, X2, where the error voltage is compared to the voltage on capacitor C1.

Capacitor C1 generates a ramping voltage by integrating the current supplied by input Iin. The voltage ramp rate will be proportional to the magnitude of current Iin. The voltage on capacitor C1 is reset to the reference voltage, Vref, by transistor M1. Input Vreset controls transistor M1 conductivity and so the resetting of the voltage across capacitor C1.

The action described above generates a pulse on the output of the comparator X2, which is the vdd switch control applied at input 222 in FIG. 2. The length of the pulse can be controlled by the error on the vdd supply regulation and the magnitude of the current Iin. Being dependent on the error of the vdd supply voltage means the pulse output of circuit 108 can be used as part of a regulation loop to regulate the vdd supply voltage.

If Iin is proportional to the current in Mvdd_switch 208, the pulse length on output vdd switch control input 222 will be inversely proportional to the rate of charge transfer through Mvdd_switch 208. This results in a Iin/C1 ramp generator compensating for any changes in the current being supplied through Mvdd_switch 208. This, in turn, means that the voltage regulation loop, including the error amplifier X1, does not need to compensate for changes in the current being supplied to Mvdd_switch 208, so increasing power supply rejection.

Current is supplied to Mvdd_switch 208 from the shunt regulator. The Iin/C1 compensation scheme means the vdd regulation loop is invariant (to first order) to changes in the shunt regulator current. Thus, the vdd regulator control circuit is independent of activity of the shunt regulator circuit.

What is claimed is:

1. A circuit comprising:
   first and second input terminals;
   a first supply rail energized from the first input terminal for providing a first supply voltage;
   a shunt regulator operable to regulate the first supply voltage by establishing a shunt current between the first and second input terminals;
   a second supply rail; and
   a switching circuit coupled to the shunt regulator and operable by a switch control signal to direct the shunt current, in a first mode, to flow to the second supply rail for providing a second supply voltage and, in a second mode, to bypass the second supply rail to the second input terminal.

2. The circuit of claim 1, wherein the input terminals are configured for coupling to an antenna and for receiving an alternating voltage from the antenna, and comprising a rectifier circuit coupled to the input terminals, operable for rectifying the alternating voltage for energizing the first supply rail and the shunt regulator.

3. The circuit of claim 2, wherein the input terminals are coupled to a tuning circuit for tuning the antenna.

4. The circuit of claim 1, wherein the shunt regulator includes a current mirror that includes two transistors having respective gates coupled to a shunt control signal for controlling the flow of the shunt current through the current mirror.

5. The circuit of claim 1, further comprising a timer circuit configured to provide the switch control signal.

6. The circuit of claim 5, wherein the timer circuit comprises: a capacitor operable for generating a ramping voltage by integrating a current, wherein the ramping voltage is proportional to the magnitude of the current; a transistor operable for resetting the voltage on the capacitor to a reference voltage; an error amplifier operable for comparing a divided second supply voltage on the second supply rail to the reference voltage and outputting an amplified error voltage; and a comparator operable for comparing the amplified error voltage with the voltage on the capacitor, and for outputting the switch control signal as a result of the comparing.

7. The circuit of claim 6, further comprising a voltage divider for providing the divided second supply voltage from the second supply voltage on the second supply rail.

8. The circuit of claim 1, wherein the second supply voltage on the second supply rail has a smaller voltage swing than the first supply voltage on the first supply rail.

9. The circuit of claim 1, further comprising one or more analog circuits coupled to the first supply rail.

10. The circuit of claim 1, further comprising one or more digital circuits coupled to the second supply rail.

11. The circuit of claim 1, further comprising a decoupling capacitor coupled to the first or second supply rail.

12. The circuit of claim 1, wherein the circuit is included in a smart card.

13. A method comprising:
receiving an alternating voltage from an antenna;
rectifying the alternating voltage, using a rectifier circuit, to provide a first supply voltage to a first supply rail;
supplying, using a current source, a shunt current; and
configuring a switch coupled to the current source with a switch control signal to enable the shunt current to flow to a second supply rail to provide a second supply voltage on the second supply rail when the switch is in a first mode, and to bypass the second supply rail when the switch is in a second mode.

14. The method of claim 13, wherein the second supply voltage has a smaller voltage swing than the first supply voltage.

15. The method of claim 14, further comprising: generating a ramping voltage by integrating a current, where the ramping voltage is proportional to the magnitude of the current; resetting a voltage on a capacitor to a reference voltage; comparing a divided second supply voltage on the second supply rail to the reference voltage and outputting an amplified error voltage; comparing the amplified error voltage with the voltage on the capacitor; and
outputting the switch control signal based on the comparing.

\* \* \* \* \*